Nov. 21, 1933.  E. C. ORR  1,936,242
INSERTED TOOTH SAW
Original Filed Feb. 25, 1930
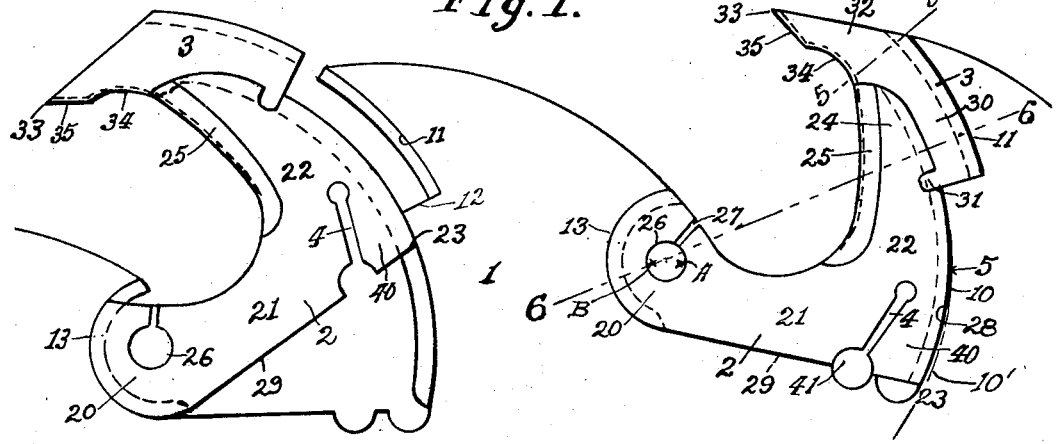
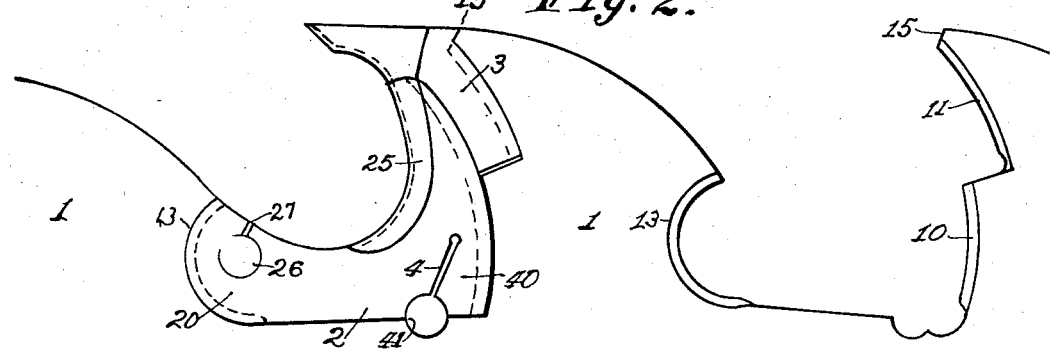
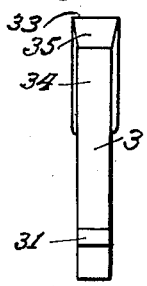
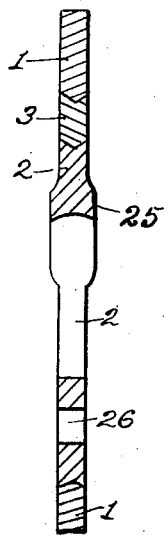
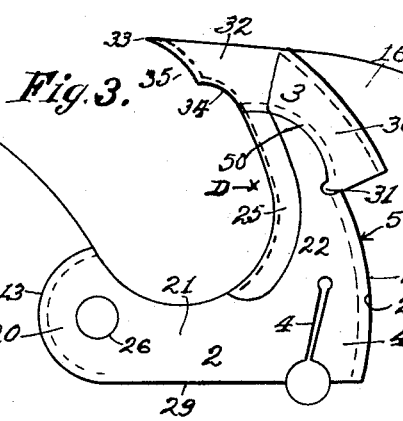
Inventor
Elijah C. Orr.
By Henry L. Reynolds.
Attorney Patented Nov. 21, 1933

1,936,242

UNITED STATES PATENT OFFICE 1,936,242

INSERTED TOOTH SAW

Elijah C. Orr, Seattle, Wash.

Refiled for abandoned application Serial No. 431,109, February 25, 1930. This application March 8, 1932. Serial No. 597,603

8 Claims. (Cl. 143—151)

My invention relates to inserted tooth saws and consists of an improved construction of tooth and holder and to the combination of such tooth and holder with the saw body and with the peculiar type of tooth and holder-receiving recess in the saw body.

One object of my invention is to provide a construction for these parts such that the teeth are better held in place without excessive strain upon any part: also, a construction in which the parts are stronger and less likely to break in use and one which will better care for and accommodate the saw dust and prevent its working rearwardly past the teeth, thereby preventing a considerable source of friction, thereby reducing the power required to turn the saw.

Another object is to provide for the insertion of a greater number of teeth than may be employed in saws of the same size and employing other constructions, without thereby weakening the saw body or the tooth parts.

My present invention consists in part of a tooth and a holder therefor, both constructed to give better strength and to cooperate to give superior operating results. This is in part secured by a design of the parts which will securely hold the teeth and at the same time avoiding unnecessary strain of the parts due merely to the act of insertion and entirely apart from strains caused by the work of cutting. Such strains, arising from conditions caused by the insertion of teeth and operative while the saw is at rest, often leave such a small margin of strength with which to resist the added strains of cutting, that many teeth are broken.

My invention also consists in part of a design of holder which may be used to secure several different designs of teeth in the same saw, it being necessary only to modify the holder in that part which engages the teeth, to conform to differences in teeth, if there be such in the part which engages the holder.

The accompanying drawing illustrates preferred embodiments of my invention. In these the same reference character indicates the same part in all figures.

Figure 1 shows a small section of the peripheral part of a saw body and two teeth inserted therein.

Figure 2 shows similar parts which differ slightly in construction.

Figure 3 shows a single tooth assembly of another construction.

Figure 4 is a front face or edge view of a tooth such as is shown in Figure 1.

Figure 5 is a transverse section of a tooth on a line corresponding with the line 5—5 of Figure 4.

Figure 6 is a tooth section on line 6—6 of Figure 1.

In the drawing 1 represents the saw body. This is provided with peripheral recesses shaped to receive and hold tooth assemblies, each consisting of a tooth and a holder. The tooth 3, comprises a shank 30, a holding teat or projection 31 and a head 32 which terminates in the cutting tip 33.

The holder 2 has a pivot head 20, a central thrust bar, body or shank 21 and a head 22 having an arcuate outer edge 28, having its center coincident with or adjacent to the center of the arc 13 of the pivot head. The saw body is cut out to receive and securely grip and hold the tooth holder when in place. The arc which engages the periphery of the pivot head of the tooth holder, preferably exactly conforms to the complemental arc of the pivot head, while the arc 10, of the saw body does not exactly conform in curvature with that of the engaging arc 28 of the tooth holder, as will later be explained.

The tooth 3 has a shank 30, a thickened head 32 and a holding or locking teat or finger 31, the latter entering a complemental recess in the arcuate edge of the holder.

The above features in their broad aspects are similar to previously used and standard constructions, but differ in details which are believed to contribute materially towards improved results.

The arcuate edges 10 and 13 of the saw are concentric with the same center, the position of this being indicated in Figure 1 at A, while the arcuate edge 28 of the holder which engages the edge 10, is concentric with a point farther removed, or as indicated at B. The radius of the arc 28 of the holder being greater than that of the arc 10 and the two arcs being tangent at a point, as 5, the arc 28 of the holder would, towards its ends, pass slightly without the arc 10. This has been indicated on the drawing by the broken line 10' in Fig. 1. The difference of radii would be determined by experience and consideration of the character of material used.

The heel section of the holder has a slot 4 forming a finger 40 which has sufficient resiliency to yield inwardly when inserted, as is indicated in Figures 1, 2 and 3 by the convergence of the side walls of the slot. This yielding has possibly been exaggerated to better illustrate the fact. By this expedient a secure but yielding grip is secured between the holder and the edge of the receiving recess, which prevents outward movement of the holder under centrifugal force generated in running and yet permits removal when desired.

The upper or outer arm 24 of the tooth holder is not slotted to provide resiliency for the reason that it engages the edge 10 of the saw body for only a short distance from the point 5 and also because its dimensions are such that it will have a measure of resiliency sufficient for the purpose without slotting.

The pivot end of the holder is provided with a hole 26 which is located without consideration of agreement with either of the centers used in striking the arcs referred to. The chief purpose of this hole is to receive one pin of a spanner or wrench used for inserting and removing the tooth holder and tooth. The heel portion of the holder is provided with a hole 41 having a like purpose. In some, and possibly in most cases, the hole 26 is connected with the throat edge of the holder by a slot 27 which permits yielding of the arm thus formed. Because of this the radius of the holder head may be made slightly larger than that of the receiving recess in the saw, the pivot head yielding when inserted.

The contacting edges of tooth, holder and saw body, are preferably of the standard rib and groove construction which prevents relative side movement, with the exception of the straight edge 29, where such construction is hardly needed. The upper arm or tip 24 of the holder head engages the inner edge of the tooth shank 30. This arcuate edge of the holder is designed to be slightly larger than the inner edge of the tooth, which latter is, in Figures 1 and 2, a continuation of the arc 10 of the saw body. The finger 24 must, therefore, yield slightly when the tooth is inserted. The finger 24 is of a proportion and dimension which permits yielding. The saw tooth shank is thus firmly gripped and by reason of the rib and groove construction of the engaging edges, and by further reason of the fact that the holder head is itself firmly held against side movement by reason of like construction of the engaging arcs 10 and 28, the tooth is firmly held against side movement. The firmness of this grip and holding effect is heightened by the fact that the arcs 10 and 28 are of relatively much larger radius than analogous portions of previous constructions.

The tip of arm 24 is preferably rounded over to provide a measure of thrust support for the tooth and also to increase the cross section of the tooth at this point and its strength at the point of maximum breaking effort. This is more pronouncedly indicated in Figure 3.

The tooth head 32 is thickened, as is customary, and this is preferably carried far enough back to overlap the arm 24 of the holder, while the forward or throat edge of the holder is also preferably thickened, making a slight rib 25 at each side. This thickening extends well down towards the bottom of the throat. The thickness of the front edge of the holder is kept somewhat less than the width of the kerf made by the saw.

The straight front or grinding face of the tooth, together with the succeeding curved face 34, as well as the front edge of the arm 24 of the holder, are hollow ground, that is, this edge is concavely curved in cross section. This provides a curved cutting edge at the cutting tip 33 which produces smoother cutting and also provides edges throughout the hollow ground portions which will function as cutting edges to act upon any sawdust or slivers which may occupy the throat.

There is always a tendency for the sawdust to crowd past the teeth and to the rear. This wedges the sawdust between the side surfaces of the saw and kerf, often producing considerable friction and consuming power. With proper hollow ground faces at the rear side of the throat, such sawdust will be either forced toward the center line of the kerf or be cut, thereby reducing the amount which can crowd past the teeth and reducing its size, both effects which reduce the friction and the power consumption. The hollow ground feature of the back edge of the throat is very effective in crowding the sawdust to the center plane of the kerf and preventing its crowding past the teeth.

The length of the arcuate section 10 of the saw body is a little more than the arc of movement required to insert and remove the tooth, so that with the tooth entirely cleared, as is shown by the tooth at the left in Figure 1, the holder is still securely held in place. In the construction shown in Figure 1, the thrust bearing or support for the tooth is at its lower end. The arcuate edge 11 of the saw body which engages the outer edge of the tooth has a center common with the arc 10, that is, at A.

The construction shown in Figure 2 differs from that of Figure 1 in having the thrust abutment for the tooth at the rear of its head, or at 15, instead of at the inner end of the shank.

In Figure 3 the outer face of the outer section 50 of the tooth holder is modified by being made an arc of a circle of shorter radius, the center being at D. This modifies the shape of the tooth shank in two ways. The width of the tooth at about the rear of its head, that is at or inwardly of the outer tip of the prong 16 of the saw body, is greater than in the other figures, thus strengthening the tooth where it is most likely to break. Also, the narrowest part of the shank is somewhat outwardly of its inner end and the enlarged inner end of the shank provides an efficient holding element for the tooth. The small holding teat is therefore not the only holding means, and may in fact, be dispensed with.

In the construction of Figure 3 the forward face of the tooth is supposed to be concavely rounded or hollow ground, as is also the front edge face of the holding arm of the tooth holder. This hollow grinding runs to the inner end of the tooth shank, that is, to the teat 31.

In a tooth holder of the type illustrated the edge which grips the saw body, that is, the edge 28, is an arc of comparatively large radius and approaches, throughout the greater part of its length, the direction of a radius of the saw. At the same time the innermost edge of the holder is straight and lies but little inwardly of the pivot point of the holder. In consequence, the recess in the saw is not relatively a deep one. The various parts reinforce each other to thoroughly support the teeth and to grip them securely.

In removing a tooth it is not necessary to remove the holder. It need be turned only as far as is indicated for the left hand tooth in Figure 1. There is thus only one member loosened or removed in replacing a tooth. This obviates the frequent misplacement or loss of holders when replacing teeth.

The shape and design of both tooth and holder makes it possible to easily mill all edges which require milling.

What I claim as my invention is:

1. In an inserted tooth saw, a saw body containing tooth receiving recesses having at one end a pivot bearing for a tooth holder and at the other end a circular-arcuate edge having its center substantially coincident with that of the pivot head, and a holder having at one end a pivot bearing complemental to and engaging the pivot bearing of the saw body and at its other end an arcuate edge of slightly different radius from that of the complemental arc of the saw body, said arcs of holder and saw body being tangent at a point outwardly of their inner ends, the holder having a slot located inwardly of one end of said arcuate edge to provide a yielding finger which permits that section of said arc conforming in curvature with that of the saw recess when the holder is turned to its final position.

2. In an inserted tooth saw, a saw body having recesses for the teeth and their holders, said recesses having at one end a circular arcuate section forming a pivot bearing for a tooth holder and at its opposite end having an inner arcuate segment also concentric with the pivot bearing but of a larger radius and an outer segment concentric with the pivot bearing but of sufficiently larger radius to provide a tooth receiving recess, a tooth having the outer edge of its shank engaging said outer arcuate segment of the saw body and its inner edge forming an outward extension of the inner arcuate segment of the saw body, a tooth holder having a pivot head fitting and turnable in the pivot bearing and a head provided with an arcuate edge concentric with a point adjacent to and beyond the pivot center and tangent with the arcuate segment of the saw body at a point outward of its inner end, said arcuate edge of the holder engaging the complemental arcuate edges of the saw body and tooth shank, the holder having a slot extending from its inner edge back of its said arcuate edge to thereby provide a yielding finger at the inner end of said arcuate edge.

3. A tooth holder for inserted tooth saws having a pivot head, an arm radially disposed relative to said pivot head, and a holding arm extending outwardly from the swinging end of the radial arm, the outer edge of said holding arm being of a circular arcuate outline concentric with a point slightly beyond the center of the pivot head, said arcuate edge having a form interlockable with a complemental edge of the saw body.

4. A tooth holder for inserted tooth saws having a pivot head, an arm radially disposed with relation to said pivot head, a holding arm extending outwardly from the swinging end of the radial arm and having an outer arcuate edge concentric with a point positioned slightly beyond the pivot axis, the holder having a slot extending from the inner edge of the radial arm inwardly of said arcuate edge to thereby provide a short yielding finger at the inner part of said arcuate edge.

5. A tooth holder for inserted tooth saws having an arcuate pivot head adapted to fit and turn in a complemental recess in the saw body, said holder having an arm extending radially from the pivot head and a holding arm extending outwardly of the saw from its swinging end, the outer edge of said holding arm being of circular-arcuate outline with its center positioned slightly beyond the pivot center, the outwardly facing edge of said holder being curved to constitute a portion of the throat for the tooth held thereby.

6. In an inserted tooth saw a tooth holder having a pivotal bearing upon the saw body and an opposite circularly-arcuate edge, the saw body having a complemental arcuate edge cooperating therewith but of a slightly shorter radius, said arcs of the holder and saw body being tangent near the middle of the length of the arc on the holder, said holder being provided with means which permit a slight inward yielding towards the ends of its said arc.

7. A tooth and holder for inserted tooth saws having the forwardly facing edges of both transversely hollow ground.

8. A tooth holder for an inserted tooth saw having an edge thereof forming the rear wall of the throat and thickened to a little less than the thickness of the kerf cut and transversely hollow ground.

ELIJAH C. ORR.